(12) United States Patent
Runius

(10) Patent No.: US 12,016,501 B2
(45) Date of Patent: Jun. 25, 2024

(54) LOCKABLE RECEPTACLE HOLDER

(71) Applicant: RUNIUS DESIGN AB, Solna (SE)

(72) Inventor: Christian Runius, Solna (SE)

(73) Assignee: Runius Design AB, Solna (SE)

( * ) Notice: Subject to any disclaimer, the term of this patent is extended or adjusted under 35 U.S.C. 154(b) by 0 days.

(21) Appl. No.: 17/786,822

(22) PCT Filed: Mar. 2, 2021

(86) PCT No.: PCT/SE2021/050170
§ 371 (c)(1),
(2) Date: Jun. 17, 2022

(87) PCT Pub. No.: WO2021/177878
PCT Pub. Date: Sep. 10, 2021

(65) Prior Publication Data
US 2023/0346171 A1   Nov. 2, 2023

(30) Foreign Application Priority Data
Mar. 2, 2020   (SE) .................................... 2050234-0

(51) Int. Cl.
*A47K 5/18*   (2006.01)
*A47K 5/12*   (2006.01)
*F16M 13/02*   (2006.01)

(52) U.S. Cl.
CPC ........... *A47K 5/1205* (2013.01); *F16M 13/02* (2013.01); *A47K 2201/025* (2013.01); *F16M 2200/02* (2013.01)

(58) Field of Classification Search
CPC ........... A47K 5/1205; A47K 2201/025; F16M 13/02; F16M 2200/02
See application file for complete search history.

(56) References Cited

U.S. PATENT DOCUMENTS

| 2,883,139 A | 4/1959 | Dobkin |
| 2,992,804 A * | 7/1961 | Doran .................. A61G 7/0503 248/311.2 |
| 4,615,476 A | 10/1986 | Hobbs et al. |
| 4,697,855 A * | 10/1987 | Lecher .................. A47B 69/00 312/321.5 |
| D620,735 S | 8/2010 | Schmidt et al. |
| 2011/0101196 A1 | 5/2011 | Schmidt et al. |
| 2018/0153354 A1 * | 6/2018 | Beckerman ......... B05B 11/0054 |

FOREIGN PATENT DOCUMENTS

| CN | 105534360 A | 5/2016 |
| CN | 106923720 A | 7/2017 |
| SE | 1650970 A1 | 2/2018 |

* cited by examiner

*Primary Examiner* — Amy J. Sterling
(74) *Attorney, Agent, or Firm* — Capitol City TechLaw

(57) ABSTRACT

A lockable receptacle holder 10 comprising a holder base portion 20 configured to support the bottom 5 of a receptacle 1; a holder upper portion 30 and an elongated holder back portion 40 extending between the holder base portion 20 and the holder upper portion 30, wherein the holder base portion 20 and the holder upper portion 30 extend laterally from the holder back portion 40 and parallel to each other, and wherein; —the holder upper portion 30 comprises a closed space C configured to at least partially enclose and releasably confine the neck 2 or shoulder 3 of a receptacle placed on the holder base portion 20, and; —a cap locking member 80 for preventing removal of a cap 9 of a receptacle 1 in the receptacle holder 10.

16 Claims, 7 Drawing Sheets

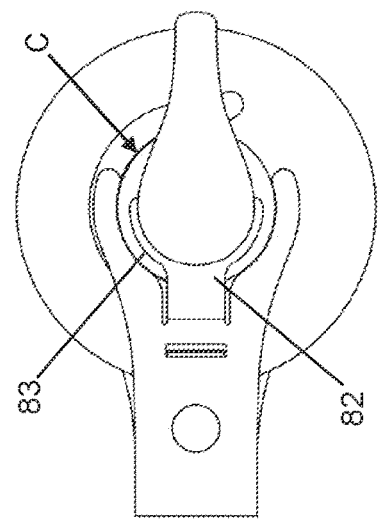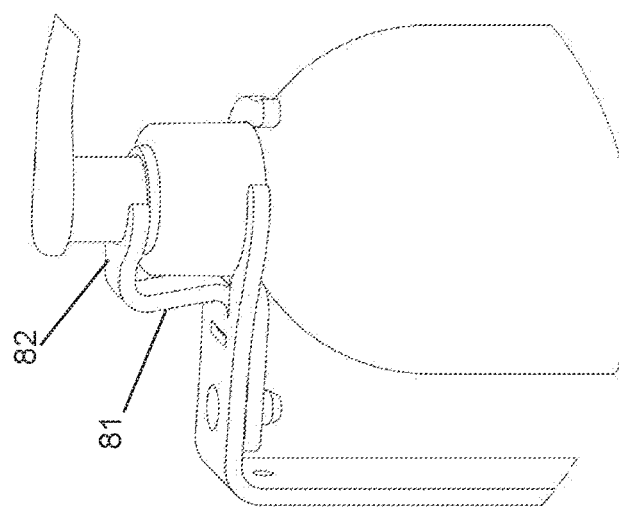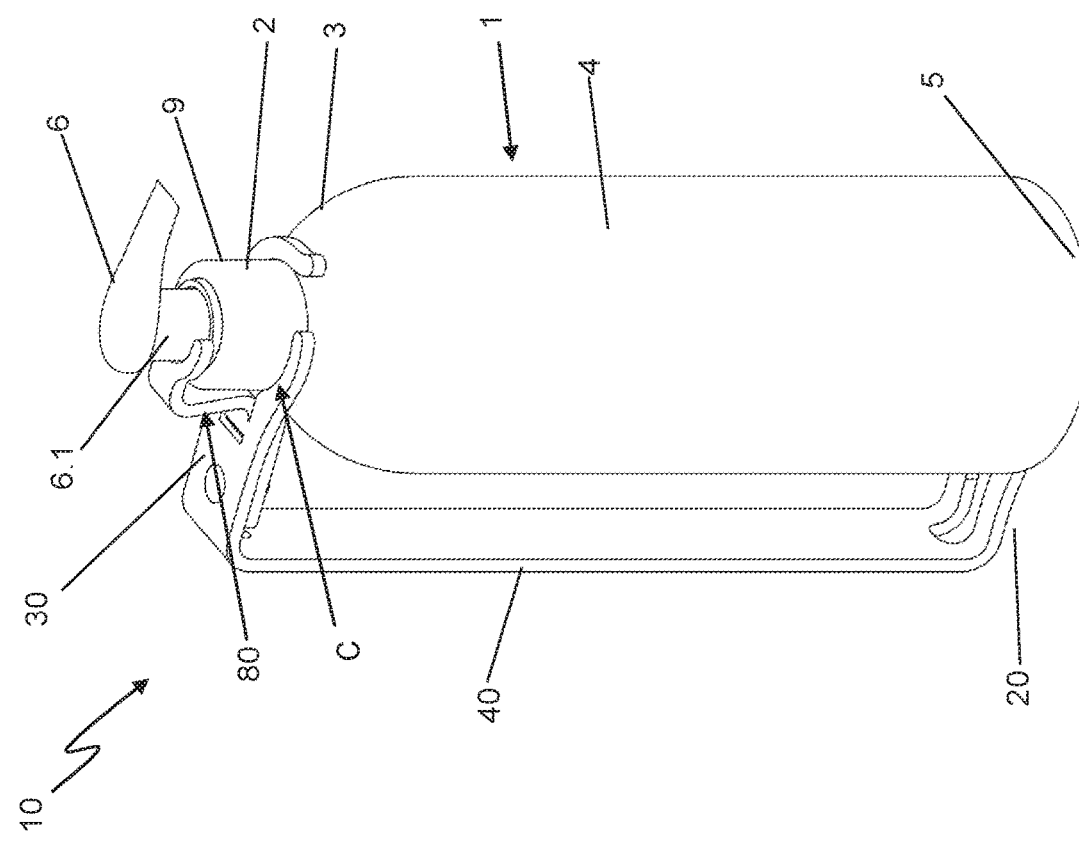

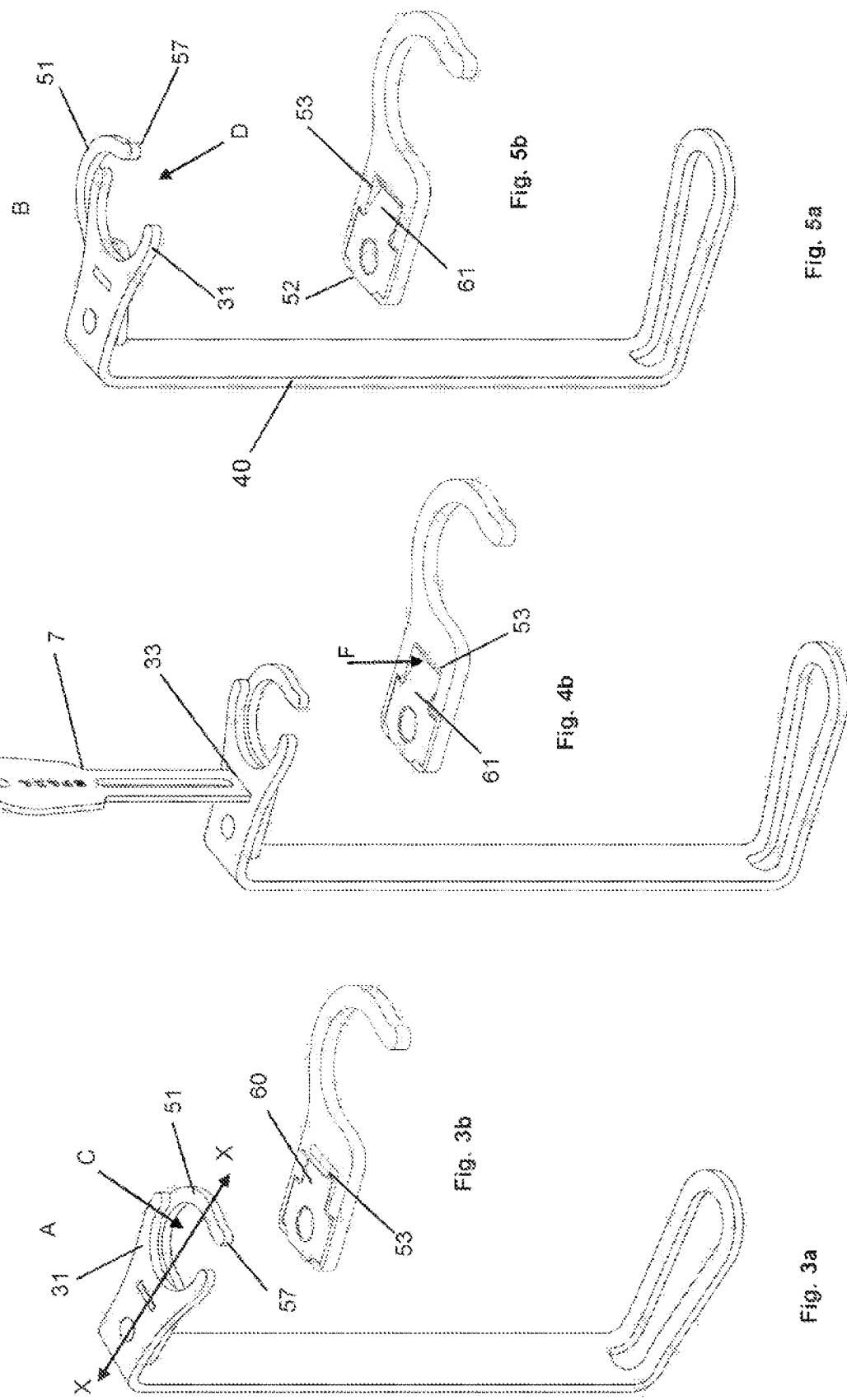

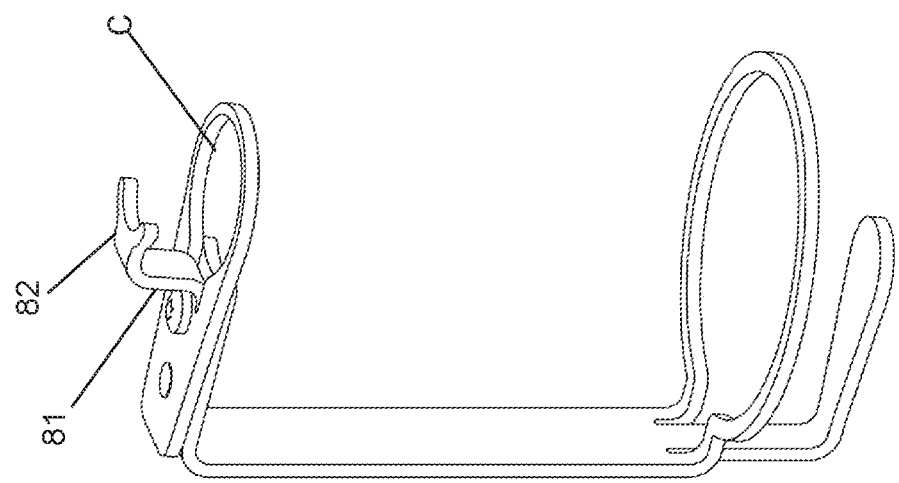
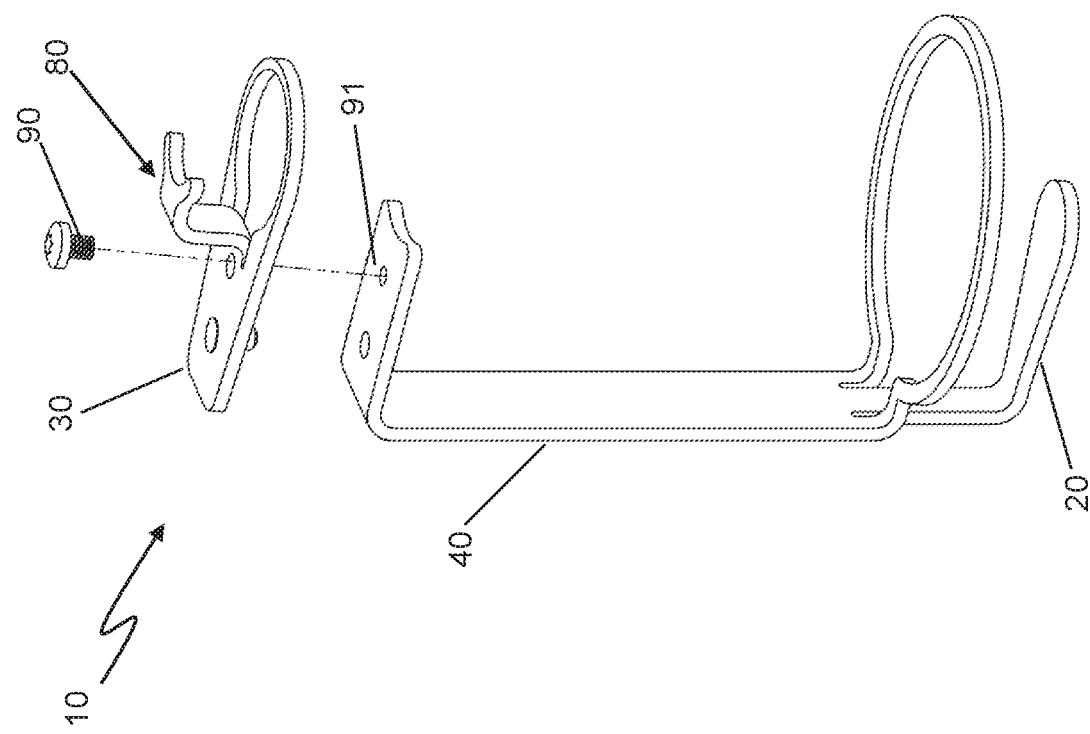

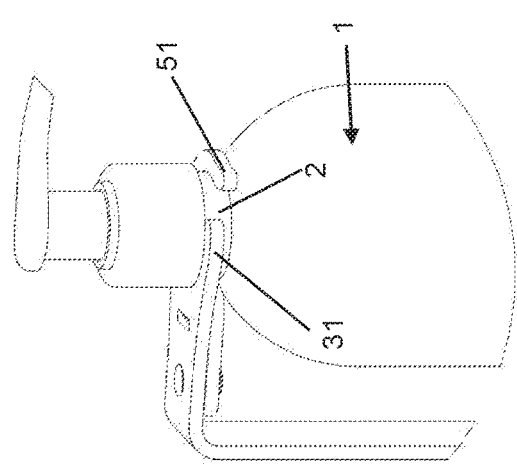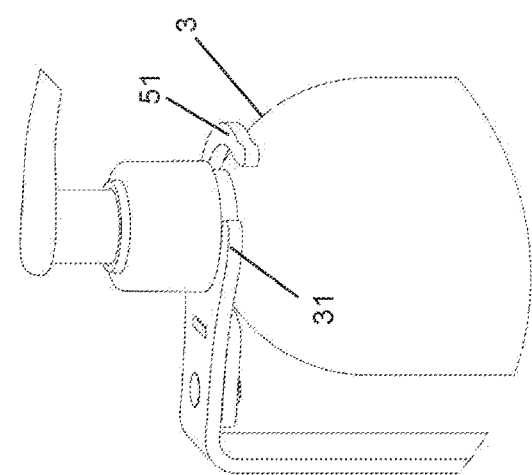

LOCKABLE RECEPTACLE HOLDER

This application claims priority under 35 USC 119(a)-(d) from SE patent application No. 2050234-0 filed on Mar. 2, 2020, the entire contents of which are incorporated herein by reference.

TECHNICAL FIELD

The present disclosure relates to a receptacle holder with a cap locking member. In detail the lockable receptacle holder is intended for a dispensing receptacle for dispensing liquid or creamy hygiene products such as soap, shampoo or lotion.

BACKGROUND ART

For environmental reasons, disposable hygiene products such as soap or shampoo in hotel rooms are increasingly being substituted with large volume dispensers. However, a general problem with refillable containers for hygiene products is that they may be subjected to theft or tampering.

To address this problem there are provided holders for hygiene product dispensers with locking mechanisms. One example is US2011/0101196 which shows a holder for a dispensing bottle that is provided with a collar plate that is provided with an opening for receiving the throat of a soap dispenser. The collar plate is guided in two rods that extend from a wall support so that the collar plate may be brought from an inward position in which the collar plate may be locked to an outward position in which the throat of a dispenser bottle may be inserted into the opening of the collar plate.

A further holder for a dispenser bottle is shown in SE 540307 C2. In this holder the collar plate is attached to the bottle support by screws. Replacement of the dispenser bottle requires removal of the screws and is therefore time consuming.

A common drawback with the known dispenser holders is that it is possible for a person to remove the cap of a receptacle that is held in the dispenser holder. This makes tampering or fouling of the liquid in the dispenser receptacle possible.

Thus, it is an object of the present disclosure to provide a receptacle holder which solves at least one of the problems of the prior art.

In particular, it is and object of the present disclosure to provide a lockable receptacle holder which provides high resistance to unauthorized access to the content of a receptacle held in the receptacle holder.

A further object of the present disclosure is to provide a lockable receptacle holder which may be manufactured at low cost.

SUMMARY OF THE INVENTION

At least one of these objects are met by a lockable receptacle holder 10 comprising a holder base portion 20 configured to support the bottom 5 of a receptacle 1; a holder upper portion 30 and an elongated holder back portion 40 extending between the holder base portion 20 and the holder upper portion 30, wherein the holder base portion 20 and the holder upper portion 30 extend laterally from the holder back portion 40 and parallel to each other, and wherein;

the holder upper portion 30 comprises an at least partially closed space C configured to at least partially enclose and releasably confine the neck or shoulder of a receptacle placed on the holder base portion 20, characterized in;

a cap locking member 80 for preventing removal of a cap 9 of a receptacle 1 in the receptacle holder 100, wherein the cap locking member 80 has a first cap locking section 81 extending upwards from the holder upper portion 30 and a second cap locking section 82 extending laterally from the first cap locking section 81 over a portion of the space C such that second cap locking section 82 extends over a portion of the cap 9 of a receptacle 1 placed on the holder base portion 20.

The lockable receptacle holder is tamper resistant and allows for secure holding of receptacle. In addition, the cap locking member effectively prevents anyone from removing the cap of a receptacle held in the receptacle holder. In practice, this ensures that unauthorized personnel cannot gain access to the content of the receptacle held in the receptacle holder.

The first cap locking section 81 may extend from a position adjacent the space C in holder upper portion 30. This allows for easy mounting and removal of a receptacle in the receptacle holder. In detail, a section of the holder upper portion 30 may thereby extend from the holder back portion 40 to the first cap locking section 81.

The cap locking member 80 may be an integral piece formed by bending. The receptacle holder thereby comprises few parts and is easy to manufacture.

According to an alternative, the second cap locking section 82 comprises an arcuate end 83 which may be configured to receive a tube portion 6.1 of a dispenser that extends into the cap of the receptacle. The advantage thereof is very effective prevention from removal of the cap from the receptacle is achieved.

The lockable receptacle holder may comprise a confining member 50 having a hook-shaped front portion 51 and pivotally attached to the holder upper portion 30 so that the confining member 50 may pivot relative the holder upper portion 30 between a closed position A in which the hook-shaped front portion 51 and the holder upper portion 30 forms the at least partially closed space C for confining the neck 2 and/or the shoulder 3 of a receptacle 1, and a release position B in which the hook-shaped front portion 51 and the holder upper portion 30 are spaced apart to allow removal of a receptacle 1 from the receptacle holder 10;

a locking member 60 attached to one of the holder upper portion 30 and the confining member 50 and having a locking portion 61 configured to be received into one opening 33,34 of a through hole 32 in the other of the holder upper portion 30 and the confining member 50 when the confining member 50 is in the closed position A, thereby preventing movement of the confining member 50 wherein, the locking portion 61 is resilient so that it may be brought out of engagement with the trough hole 32 by application of a force F onto the locking portion 61 through the other opening 33,34 of the through hole 32 thereby allowing the confining member 50 to be pivoted relative the holder upper portion 30.

The hook-shaped confining member may easily be unlocked by inserting a purposely dimensioned tool into the through hole to apply a force F unto the locking portion. Subsequently the confining member is pivoted to the side thereby allowing house-keeping personnel to easily remove the receptacle for exchange or refilling. Removal and replacement of the receptacle is easy, demands no tricky handling of the receptacle and may be performed in little time.

The holder upper portion 30 of the receptacle holder 10 may comprises an arcuate front portion 31 for receiving a portion of a neck 2 or shoulder 3 of a receptacle 1 and wherein the arcuate front portion 31 may comprise the first locking cap section 81 The arcuate front portion provides a secure support for the receptacle during operation of the confining member. Preferably, the hook-shaped front portion 51 of the confining member 50 may be rounded to form an at least partially closed circular space C with the front end 31 of the holder upper portion 30.

The through hole 32 may be configured to receive an end portion 8 of a tool 7 wherein the cross-sectional shape of the through hole 32 and the end portion 8 of the tool 7 are configured such that end portion 8 of the tool 7 may pass through the through hole 32. This provides the possibility to customize the through hole so that the locking portion only may be accessed by special tools. Thus, unauthorized opening of the receptacle holder may be prevented or made difficult.

The one of the holder upper portion 30 and the confining member 50 to which the locking member 60 is attached may comprise a receiving opening 53 for receiving the locking portion 61 of the locking member 60 when the locking portion 61 is brought out of the through hole 32. This allows for usage of a flat and thin locking portion, which in turn provides for a compact and tamper resistant receptacle holder. 9. The locking portion 61 may thereby be elongate, flat and provided with an upright edge 62 to be received in the through hole 32. For example, the locking portion 61 is a part of a locking member 60 in the form of an integral piece of resilient steel strip.

A particularly compact and tamper resistant receptacle holder 10 is provided when the confining member 50 and the locking member 60 and the holder upper portion 30 are superimposed and the through hole 32 and the locking portion 61 and the receiving opening 53 are aligned so that the locking portion 61 of the locking member 60 may be pushed into the receiving opening 53 by an end portion 8 of a tool 7 that is inserted through the other opening 33, 34 of the through hole 32. Such a receptacle holder may be realized in that the locking member 60 is arranged underneath the holder upper portion 30 and the confining member 50 is arranged underneath the locking member 60 and wherein through hole 32 extends between an upper opening 33 on an upper side 35 and a lower opening 34 on a lower side 36 of the of the holder upper portion 30.

BRIEF DESCRIPTION OF THE DRAWINGS

FIG. 1*a*-1*c*: Schematic drawings of a receptacle holder according to the present disclosure and a receptacle.

FIG. 3*a*,3*b*-5*a*,5*b*: Schematic drawings illustrating the function of the receptacle holder according to the present disclosure.

FIG. 7*a*,7*b*: Schematic drawings showing a second alternative of the lockable receptacle holder according to the present disclosure.

FIG. 8*a*, 8*b*: Schematic drawings showing receptacle holders according to further alternatives of the present disclosure.

DETAILED DESCRIPTION OF EMBODIMENTS

Figures 2, 2A:
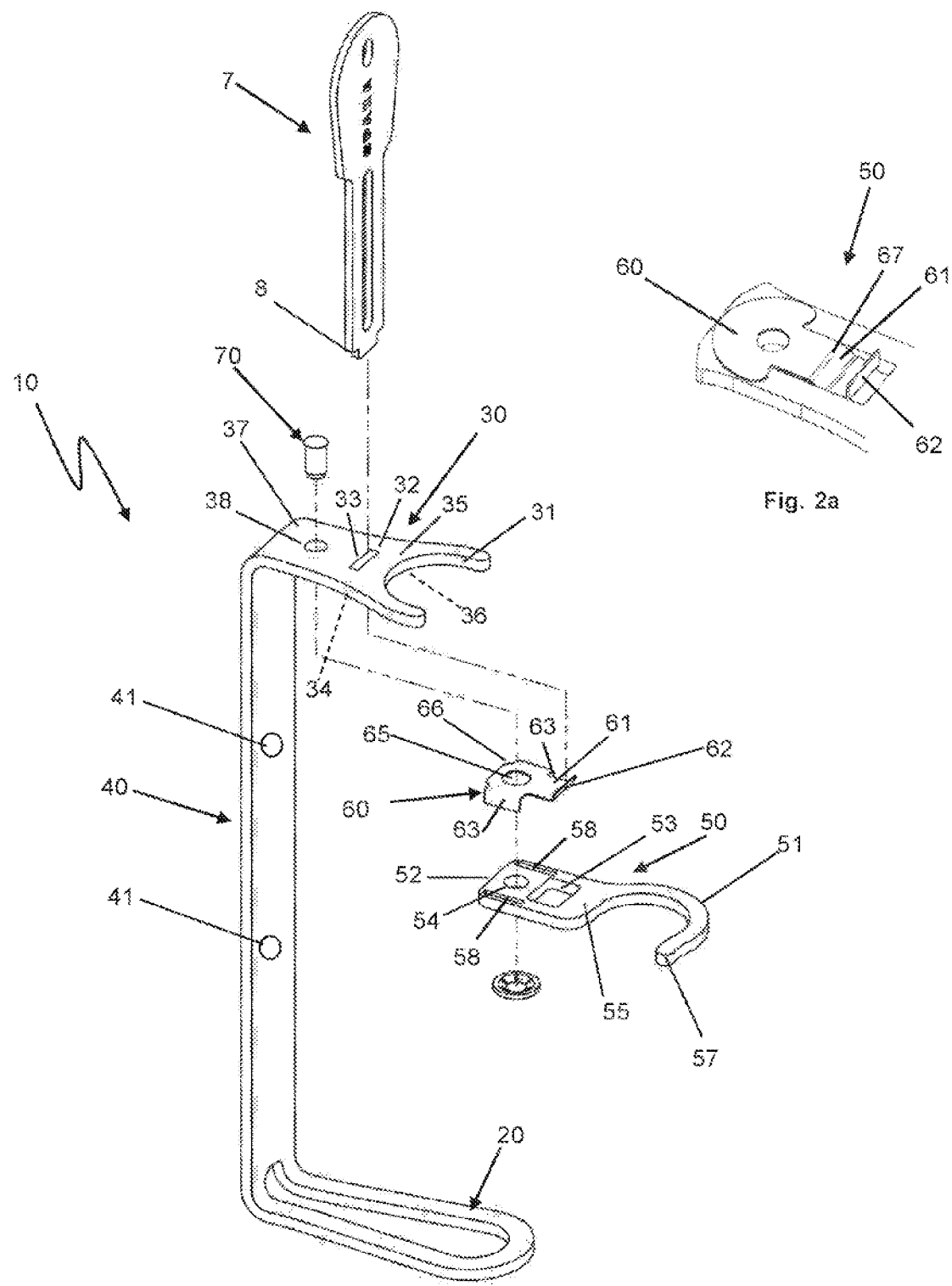
FIG. 2: A schematic drawing showing an exploded view of a receptacle holder according to the present disclosure.
FIG. 2*a*: A schematic drawing of a portion of the receptacle holder according to an alternative.

The receptacle holder according to the present disclosure will now be described more fully hereinafter. The receptacle holder according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

A "receptacle" or "container" is configured to hold liquid, semi-liquid, creamy or paste-formed substances. Typically, a receptacle is a bottle or ajar and has a neck, with a mouth, a shoulder, a body and a bottom. The receptacle may comprise a dispenser which is inserted into the mouth of the receptacle. The dispenser allows a user to pump out the content of the receptacle. The receptacle may in such case be denominated "dispenser receptacle". FIG. 1*a* shows a receptacle 1 in the form of a bottle. The receptacle has a neck 2, a shoulder 3, a body 4, bottom 5 and a cap 9 which closes the opening of the receptacle. The receptacle 1 may further have a dispenser 6 which may have a tube 6.1 that extends into the cap 9.

In the following description of the receptacle holder according to the present disclosure it is appreciated that the receptacle holder may be realized in different sizes and dimensions to fit receptacles of varying shape, size and dimension. Thus, when the receptacle holder, in the following is described with reference to a receptacle or parts thereof, it is appreciated that the receptacle holder is dimensioned in view of that receptacle.

Further in the following description, any references to directions such as "upright", "upwards", "downwards" or "lateral" are in relation to a vertical orientation of the receptacle holder in which the holder base is below the holder upper portion. It is further appreciated that the holder base and the holder upper portion may extend orthogonal to the holder back portion.

FIG. 1*a* shows the lockable receptacle holder 10 according to the present disclosure. Thus, the lockable receptacle holder 10 comprising a holder base portion 20 configured to support the bottom 5 of a receptacle 1 which further comprises a cap 9, a shoulder 3 and a neck 2. A holder upper portion 30 and an elongated holder back portion 40 extends respectively between the holder base portion 20 and the holder upper portion 30. The holder upper portion 30 comprises an at least partially closed space C configured to at least partially enclose and releasably confine the neck or shoulder of the receptacle 1. In FIG. 1*a* the space C in the holder upper portion 30 encloses and confines the neck 2 of the receptacle 1. The space C, which may be denominated "opening C" is also shown in FIG. 1*b*. A more detailed description of the above features of the receptacle holder 10 will further be provided in combination with the description of FIG. 2.

According to the present disclosure, the holder upper portion 30 comprises a cap locking member 80 for preventing removal of the cap 9 of the receptacle 1 that is held in the receptacle holder 10. The cap locking member 80 is shown in detail in FIG. 1b and comprises a first cap locking section 81 that extends from a position on the holder upper portion 30 that is adjacent the space C. The first cap locking section 81 extends thereby in direction upwards. A second cap locking section 82 extends laterally from the first cap locking section 81 over at least a portion of the space C such that the second cap locking section extends over the top of the cap 9 of the receptacle. The cap 9 is thereby effectively prevented from being removed from the neck 2 of the receptacle 1. The second cap locking section 82 may thereby extend parallel with the holder upper portion 30 and the first cap locking section 81 may extend traverse to the holder upper portion 30.

As shown in FIG. 1b, the cap locking member 80 is an integral piece which may be formed by bending. It may further be formed integral with, or e.g. welded to, the holder upper portion.

Turning to FIG. 1c, which shows a top view of the receptacle holder 10. Thus, the end 83 of the second cap locking section 82 may have arcuate shape so that it partially encloses the tube 6.1 of the dispenser 6. See also FIG. 1a. As is especially clear from FIG. 1c, the arcuate end 83 extends along approximately a semicircle. Thus, the arcuate end 83 encloses approximately half the circumference of the tube 6.1. As is understood, the arcuate and 83 may extend over a smaller portion of the tube 6.1.

FIG. 2 shows an exploded view of a lockable receptacle holder 10 according to the present disclosure.

It should be noted that in FIGS. 2-6 and 8a-9c, the cap locking member 80 has been omitted to not obscure other features. However, it is appreciated that the embodiment/s shown in FIGS. 2-6 and 8a-9c comprises the cap locking member 80 as shown in FIG. 1.

The receptacle holder 10 comprises an elongated holder back portion 40 which may be configured to be attached to a structure such as a wall (not shown). Attachment of the holder back portion 40 to the structure may for example be achieved by double sided adhesive tape or by screws (not shown) through the openings 41. The holder back portion 40 extends between a holder base portion 20 and a holder upper portion 30. Thus, the holder base portion 20 may extend from one end of the holder back portion 40. The holder base portion 20 extends opposite to the holder upper portion 30. The holder base portion 20 is configured to support the bottom 5 of a receptacle (not shown). In FIG. 2 the holder base portion 20 therefore extends approximately perpendicular from the holder back portion 40 and has a width and a length sufficient to support the bottom 5 of a receptacle 1 (not shown).

The holder upper portion 30 may extend from a second end of the holder back portion 40. The holder upper portion 30 may thereby extend approximately parallel with the holder base portion 20. The front portion 31 of the holder upper portion 30 points away from the holder back portion 40. The distance between the holder upper portion 30 and the holder base portion 20 may be selected such that the front end 31 of the holder upper portion faces the neck or shoulder of a receptacle that is supported on the holder base portion 20. The front end 31 of the holder upper portion 30 may be configured to receive a portion of the neck or shoulder of a receptacle that is supported on the holder base portion 20. In FIG. 2, the front end 31 of the holder upper portion 30 is arcuate, i.e. has an arc-shaped recess. However, the front end 31 of the holder upper portion 30 may have a square or triangular recess. In the embodiment shown in FIG. 2, the holder upper portion 30 comprises a through hole 32 that extends between an upper opening 33 on the upper side 35 of the holder upper portion 30 and a lower opening 34 on the lower side 36 of the holder upper portion. The through hole 32 is dimensioned such that a locking portion 61 of a locking member 60 may be received through the lower opening 34 and such that at least the end portion 8 of a tool 7 may be inserted through the upper opening 33. The cross-section of the end portion 8 of the tool 7 may thereby have the same or smaller dimensions as cross-section of the through hole 32. The cross-sectional shape of the end portion 8 of the tool 7 and the cross-sectional shape of the through hole 3 may be same or similar. For example, as shown in FIG. 2, the through-hole 32 may be of rectangular cross-section and the end portion of the tool 7 may also be of rectangular cross-section. The length of the end portion 8 of the tool 7 is selected such that the end portion 8 extends through or flush with the lower opening 34 of the through hole.

A shaft opening 38 for a pivot shaft 70 is provided in the rear portion 37 of the holder upper portion 30. The rear portion 37 is located between the through hole 32 in the holder upper portion 30 and the holder back portion 40.

The receptacle holder 10 further comprises a confining member 50 which has a hook-shaped front portion 51 and a rear portion 52 which may be rectangular. The hook-shaped front portion 51 has a front end 57, i.e. a free front end 57. In FIG. 2, the hook-shaped front portion 51 is rounded, however it may also have other configuration such as triangular- or rectangular hook-shape. The confining member 50 is pivotally attached to the holder upper portion 30. The confining member may thereby pivot relative the holder upper portion 30 in a plane that is parallel to the width and length extension of the holder upper portion 30. The confining member 50 may thereby be pivotally attached to a pivot shaft 70 that extends through a shaft opening 54 in the rear portion 52 of the confining member 50 and the shaft opening 38 in the holder upper portion 30. In the described embodiment, the confining member 50 comprises a receiving opening 53 that is provided in the rear portion 52 of the confining member 50. For example, the receiving opening 53 is provided between the shaft opening 54 and the hook-shaped front portion 51 of the confining member 50. The receiving opening 53 may be a through-hole or a recess, and is configured to receive a locking portion 61 of a locking member 60.

The locking member 60 comprises a locking portion 61 and a rear portion 66 from which the locking portion 61 may extend. The locking portion 61 is configured to extend into the through hole 32 in the upper holder portion 30. The locking portion 61 may therefore be elongated and have an upright edge 62. That is, directed in direction away from the upper surface of the locking member 60. In the shown embodiment, the locking portion 61 is a flat. However, the locking portion 61 may have other configuration, for example rod-shaped. FIG. 2a shows a flat and bent locking portion 61 that will be described herein below. It is also possible to divide the locking portion 61 in to two locking portion halves (not shown). In the shown embodiment, the locking member 60 is configured to be attached to the rear end of the confining member 50. The rear portion 66 of the locking member 60 may therefore have attachment means 63 in the form of parallel flanges that may be inserted into corresponding openings 58, such as grooves in the confining member 50. Alternatively, the locking member 60 may be glued or welded to the confining member 50. The locking portion 61 is resilient. For example, the locking member 60 or at least the locking portion 61 is manufactured from resilient material such resilient steel strip such as spring steel. Alternatively, plastic material such as polypropylene.

The locking member 60 may be arranged such that the locking portion 61 extends over the receiving opening 53 in the confining member 50.

The rear portion 66 of the locking member 60 may comprise an opening 65 for the pivot shaft 70. The pivot shaft may be a press pin that is riveted into the holder upper portion 30.

In assembled state, the confining member 50 and the locking member 60 and the holder upper portion are superimposed and the through hole 32 and the locking portion 61 and the receiving opening 53 are aligned so that the locking portion 61 of the locking member 60 may be pushed into the receiving opening 53 by a tool 7 inserted through the upper opening 33 of the through hole 32. As shown in FIG. 2, the locking member 60 is arranged underneath the holder upper portion 30 and the confining member 50 is arranged underneath the locking member.

The function of the receptacle holder 10 according to the present disclosure will in the following be described with reference to FIGS. 3a, 3b-5a, 5b and 6.

Figure 6:
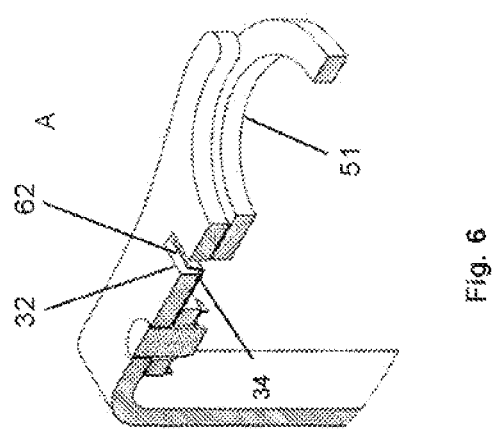
FIG. 6: A sectional view of a portion of the receptacle holder according to the present disclosure.

FIG. 3a shows the assembled receptacle holder 10 in a position A in which the front portion 31 of the holder upper portion 30 and the hook-shaped front portion 51 of the confining member 50 limits a partially closed space C which is configured to confine the neck or shoulder of a receptacle (not shown in FIG. 3a). By "confine" is meant that any opening between the front portion 31 of the holder upper portion 30 and the end 57 of the hook-shaped front portion 51 of the confining member 50 is too small to allow passage of a neck or shoulder of a receptacle. FIG. 6 shows a cross-sectional view taken along line X-X in FIG. 3a. Thus, when the confining member 50 is in position A, the upright edge 62 of the locking portion 61 of the locking member 60 extends into the lower opening 34 of the through hole 32. The locking portion 61 therefore locks the confining member 50 and prevents any pivotal movement thereof. FIG. 3b shows the locking portion 61 extending over, but not beyond, the receiving opening 53 in the confining member 50.

FIG. 4a shows the tool 7 inserted into the upper opening 33 of the through opening 32. The tip 8 of the tool 7 thereby exerts a force F onto the upright edge 62 of the locking portion 61 and presses the locking portion 61 downwards into the receiving opening 53 (see FIG. 4b). When the upright edge 62 has been pushed out of the through hole 32, the confining member 50 is released to pivot relative the holder upper portion 30. In the described embodiment, as shown in FIG. 5, the holder upper portion 30, the locking member 60 and the confining member 50 are superimposed with essentially no gap between them. The tool 7 may therefore be configured such that the end portion 8 thereof merely extend through the through hole 32. This will suffice to force the upright edge 62 of the locking portion 61 into the receiving opening 53 so that the upright edge 62 is flush with the upper surface 55 of the confining member. The confining member 50 will thereby be released to pivot.

However, it is possible to arrange the holder upper portion 30 and the confining member 50 superimposed with a gap between them (not shown). In this case, the tip 8 of the tool 7 may be elongated to extend through the through hole 32 and through the gap between the holder upper portion 30 and the confining member 50 in order to force the edge 62 of the locking portion 61 out of the through hole and into the receiving opening 53.

It is further possible to arrange the holder upper portion 30 and the confining member 50 superimposed with a gap that is wide enough to accommodate the edge 62 of the locking portion. In that case the receiving opening 53 in the confining member 50 may be omitted (not shown).

FIG. 5a shows the receptacle holder 10 in a situation where the confining member 50 is pivoted relative the holder upper portion 30 to a release position B. In this position the end 57 of the hook-shaped front portion 51 is spaced apart from the front portion 31 of the holder upper portion 30 such that an opening D is formed between the end 57 of the hook-shaped front portion 51 and the front portion 31 of the holder upper portion 30. The opening D is sufficiently large to allow removal of a receptacle (not shown) from the receptacle holder. Thus, the opening D is sufficiently large to allow passage of the neck or shoulder of the receptacle. The upright edge 62 of the locking portion is in sliding contact with the lower surface 36 of the holder upper portion 30 during pivoting from the locked position A to the release position B. The rear portion 52 of the confining member 50 may be arranged such that it hits the holder back portion 40 when the confining member 50 is in the release portion B which prevents further pivoting of the confining member 50. This is favorable because the locking portion 61 may be kept in contact with the lower side of the holder upper portion which in turn may prevent damage of the locking portion when the confining member is pivoted towards the closed position A.

A receptacle 1 may be inserted and locked into the receptacle holder 10 by performing the steps described above in reversed order.

Although a particular embodiment has been disclosed in detail this has been done for purpose of illustration only, and is not intended to be limiting. In particular, it is contemplated that various substitutions, alterations and modifications may be made within the scope of the appended claims.

For example, FIGS. 7a and 7b shows a lockable receptacle holder 10 according to a second alternative of the present disclosure. The receptacle holder 10 according to the second alternative is essentially identical with the lockable receptacle holder 10 according to the first alternative and therefore only differencing features will be described herein below.

Thus, the receptacle holder 10 comprises a holder upper portion 30 with a closed space C configured to at least enclose and releasably confine the neck or shoulder of the receptacle 1 (not shown). The space C in the holder upper portion 30 encloses and confines the neck 2 of the receptacle 1. The holder upper portion 30 is releasably attachable to the receptacle holder 10 by means of screws 90 that may be received in bores 91 through the holder upper portion 30 and the holder back portion 40. When the upper holding portion 30 is attached by the screws 90 to the holder back portion 40, the receptacle 1 (not shown) is locked in the receptacle holder 10. When the upper holder portion 30 is unscrewed the neck of the receptacle may be released from the space C and the receptacle 1 (not shown) may be removed from the receptacle holder 10. According to the second alternative of the present disclosure, the holder upper portion 30 comprises a cap locking member 80 for preventing removal of the cap 9 of the receptacle 1 that is held in the receptacle holder (not shown). The cap locking member 80 comprises a first cap locking section 81 that extends from a position adjacent the space C in direction upwards. A second cap locking section 82 extends laterally from the first cap locking section 81 over at least a portion of the space C such that the second cap locking section extend over the top of the cap 9 of the receptacle.

In an alternative, the receptacle holder 10 according to the present disclosure has hereinabove been described in an embodiment in which the holder upper portion 30 comprises the through hole 32 and the confining member 50 comprises the receiving opening 53 and wherein the locking member 60 is attached to the confining member 50. In the described embodiment, the confining member 50 is arranged underneath the holder upper portion 30.

However, it is possible that the confining member 50 is arranged above the holder upper portion 30. The confining member 50 may thereby comprise the through hole 32 and the holder upper portion 30 may comprise a receiving opening 53 and the locking member 60 may be attached to the upper surface 35 of the holder upper portion 30 such that the upright edge 62 of the locking portion 61 may enter into the through hole 32 (not shown in the figures).

The confining member 50 may be mirror-inverted and arranged to pivot in opposite direction than shown FIG. 5a.

It is further possible to arrange the holder upper portion 30 such that the arcuate front portion 31 is oriented 90° to the facing direction of the holder back portion (not shown). The receptacle may thereby be introduced from the side of the receptacle holder.

Also further alternatives or modifications of the receptacle holder 10 according to the present disclosure are feasible. For example:

FIG. 8a shows a configuration in which the hook-shaped front portion 51 extends partially around the neck 2 of a receptacle 1. FIG. 8b shows a configuration in which the hook-shaped front portion 51 extends partially around the shoulder 3 of a receptacle 1. In FIGS. 8a, and 8b, the arcuate front portion 31 of the holder upper portion 30 is configured to receive a portion of the neck 2 of the receptacle 1. However, the front portion 31 of the holder upper portion 30 may be configured to receive a portion of the shoulder 3 of a receptacle 1 (not shown).

Figure 9A:
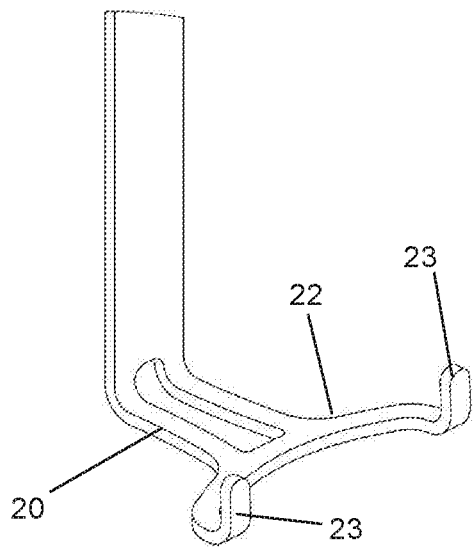
FIG. 9*a*-9*c*: Schematic drawings showing alternative base portions of the receptacle holder according to the present disclosure.
Figure 9B:
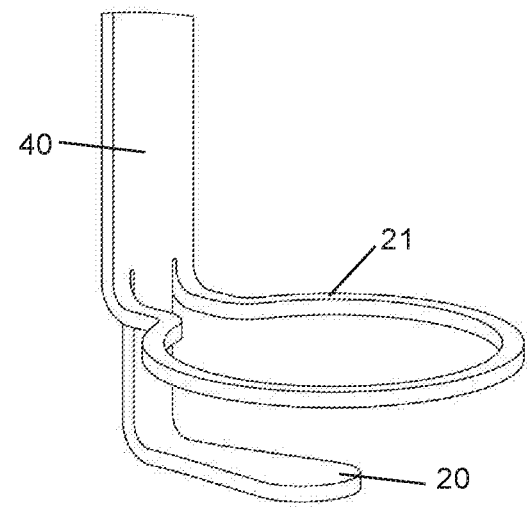

The holder receptacle 10 may comprise retainer elements for holding the body or the bottom of a receptacle in order to further prevent lateral movement of a receptacle in the receptacle holder. For example, as shown in FIG. 9a, the holder base portion 20 may comprise an arcuate lateral extension 22 having upright retainer pins 23 in each end. In use, the retainer pins 23 engage the bottom of a receptacle. FIG. 9b shows a retainer element 21 in the form of a ring, which extends from the holder back portion 40 above the holder base portion 20. The ring shaped retainer element is configured to hold the body of a receptacle.

Figure 9C:
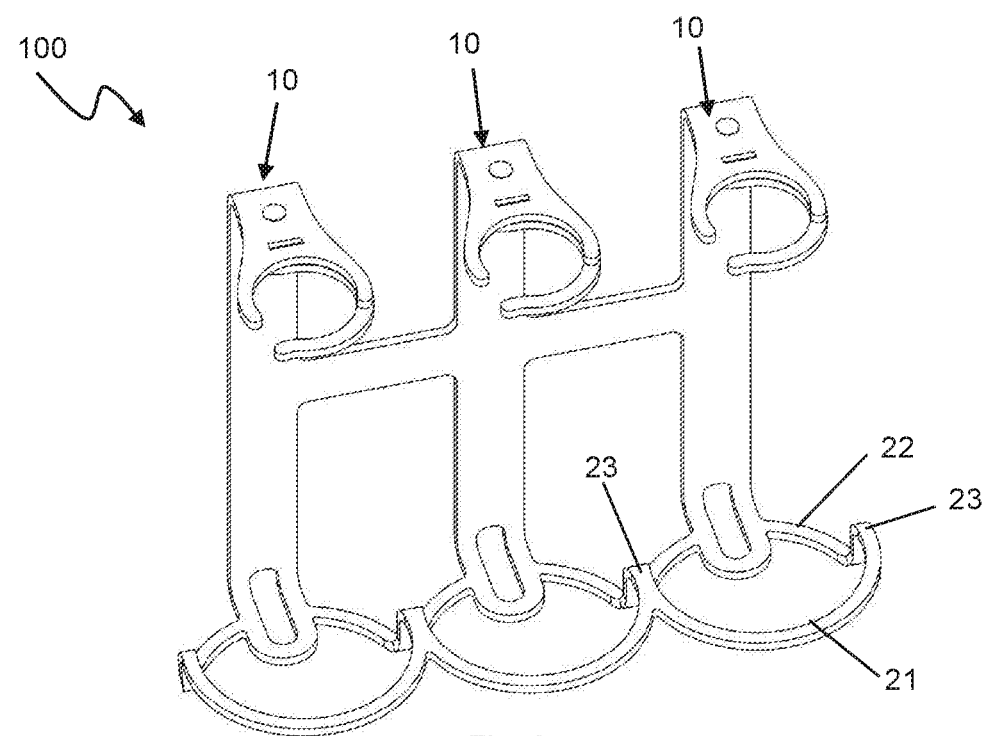

The present disclosure also relates to a receptacle holder unit 100 comprising two or more receptacle holder 10 that are joined together. FIG. 9c shows a receptacle holder unit 100 comprising three receptacle holder 10. In FIG. 9c, the receptacle holder unit is integrally formed. However, it is possible to join two or more receptacle holder 10 to each other (by e.g. welding) to achieve a receptacle holder unit. FIG. 9c also shows a further alternative of a retainer element 21. The holder base portion comprises a first arcuate lateral extension 22 that extends in a concave manner from the holder base portion 20 and that has upright pins 23 in each end. A retainer element 21 in the form of a ring segment extends convexly between the upright pins and may thereby engage the body of a receptacle.

FIG. 2a shows an alternative configuration of the confining member 50 and the locking member 60 wherein the attachment means 63 in the form of flanges and the openings 58 in the form of grooves are omitted. In the configuration of FIG. 2a, the locking member 60 is prevented from pivoting relative the confining member 50 in a plane that is parallel to the width and length extension of the confining member 50 by a part of the locking portion 61 extending into the receiving opening 53. Thus, in the assembled receptacle holder 10, a part of the locking portion 61 extends into the receiving opening 53 at all times (also when no tool 7 is inserted through the upper opening 33). For this reason, the locking portion 61 may comprise at least one bend 67 such a part of the locking portion is bent to extend into the receiving opening 53.

As has been described above with reference to FIGS. 3a, 3b-5a, 5b and 6, the locking portion 61 of the locking member 60 may be pushed into the receiving opening 53 by a tool 7 inserted through the upper opening 33 of the through hole 32. In the configuration of FIG. 2a the locking portion 61, a part of which already extends into the receiving opening, is pushed further into the receiving opening 53 by the tool such that the upright edge 62 is pushed out of the through hole 32. As a result, the confining member 50 is released to pivot relative the holder upper portion 30.

Moreover, although specific terms may be employed herein, they are used in a generic and descriptive sense only and not for purposes of limitation. Furthermore, as used herein, the terms "comprise/comprises" or "include/includes" do not exclude the presence of other elements. Finally, reference signs in the claims are provided merely as a clarifying example and should not be construed as limiting the scope of the claims in any way.

The invention claimed is:

1. A lockable receptacle holder comprising:
   a holder base portion configured to support a bottom of a receptacle, the receptacle including a body, a neck, a shoulder, a cap, and a dispenser with a tube that extends into the cap;
   a holder upper portion;
   an elongated holder back portion extending between the holder base portion and the holder upper portion;
   wherein the holder base portion and the holder upper portion extend laterally from the holder back portion and parallel to each other;
   wherein the holder upper portion includes an at least partially closed space configured to at least partially enclose and releasably confine the neck or the shoulder of the receptacle placed on the holder base portion;
   a cap locking member for preventing removal of the cap of the receptacle that is confined in the receptacle holder by they holder upper portion;
   wherein the cap locking member has a first cap locking section extending upwards from the holder upper portion and a second cap locking section extending laterally from the first cap locking section over a portion of the space such that the second cap locking section extends over a portion of the cap of the receptacle placed on the holder base portion;
   wherein the second cap locking section includes an end that is shaped to partially enclose the tube of the receptacle.

2. The lockable receptacle holder according to claim 1, wherein the first cap locking section extends from a position adjacent the space in the holder upper portion.

3. The lockable receptacle holder according to claim 2, wherein a section of the holder upper portion extends from the holder back portion to the first cap locking section.

4. The lockable receptacle holder according to claim 1, wherein the cap locking member is of a unitary, one-piece construction formed by bending.

5. The lockable receptacle holder according to claim 1, wherein the second cap locking section comprises an arcuate end.

6. The lockable receptacle holder according to claim 1, comprising:
- a confining member having a hook-shaped front portion and pivotally attached to the holder upper portion, such that the confining member is pivotable relative the holder upper portion between a closed position in which the hook-shaped front portion and the holder upper portion form the at least partially closed space for confining the neck and/or the shoulder of the receptacle, and a release position in which the hook-shaped front portion and the holder upper portion are spaced apart to allow removal of the receptacle from the receptacle holder; and
- a locking member attached to one of the holder upper portion and the confining member, the locking member having a locking portion configured to be received into a first opening of a through hole in the other of the holder upper portion and the confining member when the confining member is in the closed position, thereby preventing movement of the confining member;
- wherein the locking portion is resilient, such that it is disengageable from the trough hole by application of a force onto the locking portion through a second opening of the through hole, thereby allowing the confining member to pivot relative the holder upper portion.

7. The lockable receptacle holder according to claim 1, wherein the holder upper portion comprises an arcuate front portion for receiving a portion of the neck or the shoulder of the receptacle; and
- wherein the arcuate front portion comprises the first cap locking section.

8. The receptacle holder according to claim 6, wherein the hook-shaped front portion of the confining member is rounded to form an at least partially closed circular space with the front end of the holder upper portion.

9. The receptacle holder according to claim 6, wherein the through hole is configured to receive an end portion of a tool; and
- wherein the through hole and the end portion of the tool are configured such that at least the end portion of the tool is passable through the through hole to apply the force onto the locking portion.

10. The receptacle holder according to claim 9, wherein the confining member and the locking member and the holder upper portion are superimposed and the through hole and the locking portion and a receiving opening in the confining member are aligned so that the locking portion of the locking member is pushable into the receiving opening by the end portion of the tool that is inserted through the second opening of the through hole.

11. The receptacle holder according to claim 6, wherein the through hole extends between the first and the second openings.

12. The receptacle holder according to claim 1, wherein the cap locking member and the holder upper portion are of a unitary, one-piece construction.

13. The receptacle holder according to claim 1, wherein the cap locking member is formed by bending.

14. The receptacle holder according to claim 1, wherein a section of the holder upper portion extends from the holder back portion to the first cap locking section.

15. The receptacle holder according to claim 5, wherein the arcuate end extends along a semicircle.

16. A lockable receptacle holder comprising:
- a holder base portion configured to support a bottom of a receptacle;
- a holder upper portion;
- an elongated holder back portion extending between the holder base portion and the holder upper portion;
- wherein the holder base portion and the holder upper portion extend laterally from the holder back portion and parallel to each other;
- wherein the holder upper portion includes an at least partially closed space configured to at least partially enclose and releasably confine a neck or a shoulder of the receptacle placed on the holder base portion;
- a cap locking member for preventing removal of a cap of the receptacle in the receptacle holder;
- wherein the cap locking member has a first cap locking section extending upwards from the holder upper portion and a second cap locking section extending laterally from the first cap locking section over a portion of the space such that the second cap locking section extends over a portion of the cap of the receptacle placed on the holder base portion;
- a confining member having a hook-shaped front portion and pivotally attached to the holder upper portion, such that the confining member is pivotable relative the holder upper portion between a closed position in which the hook-shaped front portion and the holder upper portion form the at least partially closed space for confining the neck and/or the shoulder of the receptacle, and a release position in which the hook-shaped front portion and the holder upper portion are spaced apart to allow removal of the receptacle from the receptacle holder; and
- a locking member attached to one of the holder upper portion and the confining member, the locking member having a locking portion configured to be received into a first opening of a through hole in the other of the holder upper portion and the confining member when the confining member is in the closed position, thereby preventing movement of the confining member;
- wherein the locking portion is resilient, such that it is disengageable from the trough hole by application of a force onto the locking portion through a second opening of the through hole, thereby allowing the confining member to pivot relative the holder upper portion.

* * * * *